April 25, 1950  H. ALLEN  2,505,270
VALVE
Filed April 6, 1945

HERBERT ALLEN INVENTOR
BY

UNITED STATES PATENT OFFICE 2,505,270

VALVE

Herbert Allen, Houston, Tex., assignor to Cameron Iron Works, Houston, Tex., a corporation of Texas Application April 6, 1945, Serial No. 586,901

5 Claims. (Cl. 251—101)

This invention relates to valves and more particularly to the form of sealing means incorporated in the valve closure member to seal against the valve housing when the closure member is closed.

The invention in the specific example shown and described relates to a valve structure provided with a rotating plug, in which the rotary plug valve has incorporated in recesses provided in its surface a special form of sealing or packing member, adapted to seal against the valve housing when the plug is closed.

The invention has as its principal object provision of a valve having a fluid pressure actuated sealing means on the valve closure member which will not tend to tear off or be blown past the closure member, against the valve housing, or extruded through the valve in any way.

Another object is to provide a valve closure member with the sealing means in the closure member whereby the closure member is sealed to the valve housing on the upstream side of the closure member.

Another object is to provide such a sealing means with a sealing lip of which that part located adjacent one edge of the sealing means will pass the opposite edge of the opening in the valve housing without interference and without catching on the edge of that opening.

Other objects will become apparent as the description proceeds.

Referring to the accompanying drawings.

Figure 2:
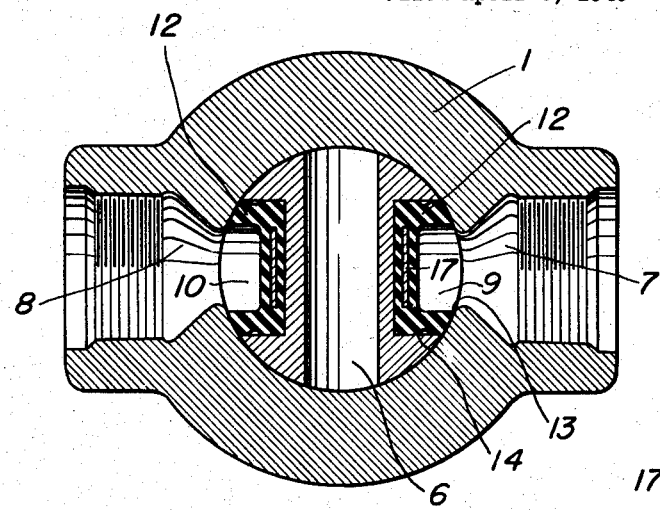
Figure 2 shows a cross section taken through the valve structure of Figure 1 along a plane at right angles to the plane of Figure 1
Figure 1:
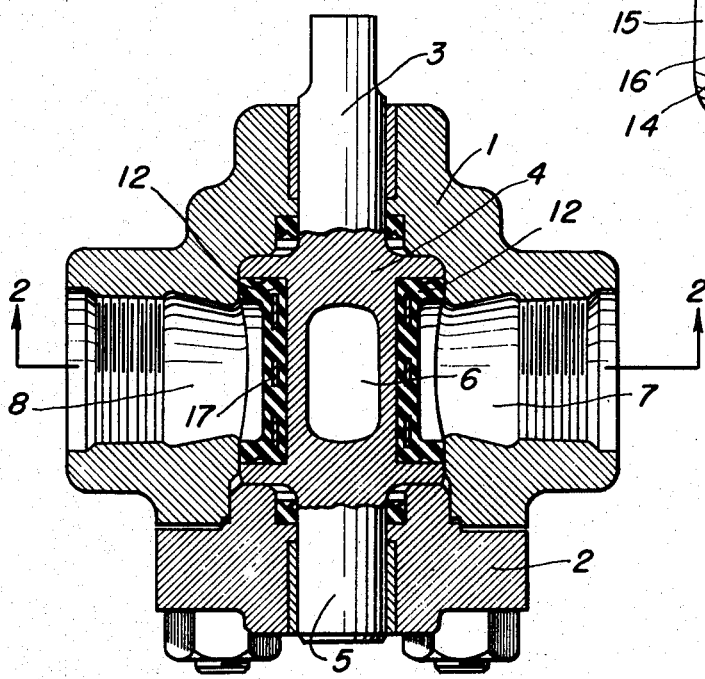
Figure 1 illustrates a cross section of a plug valve structure embodying the invention, the section being taken along the axis of the flow passage therethrough and in a plane along the axis of the plug, showing the plug in closed position.

Referring to Figures 1 and 2, all parts of which are not identified since the parts are common and well known in the art, 1 designates the valve housing to which is securely fastened the cover 2. A rotating stem 3 is rotatably mounted in and passes through the valve housing and forms a part of the rotary plug 4. The stem is rotatably sealed into the housing by suitable packing material and the rotary plug has the bearing pintle 5 rotatably mounted in the base portion 2, this pintle being also rotatably sealed into the base portion by suitable packing material. The plug is thus rotatably mounted in the closure chamber which intersects the flow passage through the valve housing. The rotary plug 4 is provided with the transverse flow passage 6, which when the rotary plug is in open position communicates with one end of the flow passage through the valve structure at 7 and with the other end thereof at 8.

Figure 3:
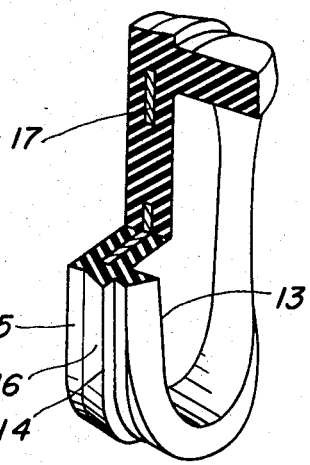
Figure 3 shows the sealing means employed in the structure of Figures 1 and 2, the same being shown partly in section and partly in perspective.

In the surface of the rotary plug valve 4 in areas lying on an axis at right angles to the axis of the bore 6, there are provided cup-shaped recesses 9 and 10, machined into the body of the plug 4 and having perimeter shaped as is the sealing ring shown in Figure 3. The top, side and back walls of these machined recesses are at right angles to each other and the recesses are machined to a depth sufficient to accommodate the depth of the sealing ring.

The cup-shaped sealing ring as an entirety is designated in Figures 1 and 2 as 12, and comprises the following parts which go to make up the same. The outer surface consists not only of the sealing lips 13 and 14, but of a peripheral portion part of which 15 is at right angles to the back wall of the sealing ring and part of which 16, flares outwardly with respect to the part 15. The sealing ring is made of reinforced rubber or other flexible material. With respect to the main portion of the sealing ring it can be said that the lips 13 and 14 are outwardly presented. The bottom of the cup-shaped sealing member is reinforced by a relatively hard and stiff member 17, which may be embedded therein.

Two sealing rings of the form shown in Figure 3 are inserted into the plug recesses 9 and 10 respectively and by virtue of their flaring portions 16 tightly engage the inner surfaces of the recesses, serving both to prevent the sealing rings from being dislodged from the recesses and to form seals with the recesses and thus exclude foreign matter from the recesses beyond the sealing element.

Unlike the valves of the prior art employing sealing elements in the body or valve housing, this valve with the packing on the plug provides a seal by means of the packing on the upstream side 7 of the plug. The pressure existing on the upstream side enters the interior of the cup-shaped sealing ring and spreads it in all directions, particularly pressing its outermost lips 13 and 14 against the inner surface of the valve housing and the walls of the recesses 9 and 10 of the plug.

When the plug valve is in closed position (see Figure 2), and is turned toward open position, the first movement serves to uncover the trailing edge portion of the sealing ring, but this creates a situation in which both of the surfaces of the sealing lip 13 of the sealing ring are subjected to the same pressure so that there is no longer any tendency for this sealing ring to be forced against the valve housing or extruded through the valve in any way. With the same pressure on both sides of this sealing lip, and with the lip formed so that it will not tend to extend outwardly beyond the contour of the plug valve, the sealing lip may pass the opposite edge of the upstream opening 7 without interference and without catching on the edge of that opening. The closing of the plug valve is a mere reversal of the action just described.

It is clear from this description that the principal object of the invention is to provide a plug valve having sealing means which will be forced into sealing engagement both with the valve housing and with the recesses in the plug valve by the pressure from the upstream side of the valve.

All of the objects and advantages set forth in connection with this invention have therefore been attained.

The invention having thus been described, what is claimed is:

1. In a valve structure, a valve housing having a flow passage therethrough and a chamber for a valve closure member intersecting said passage, a closure member in said chamber and movable to open and close said passage and having a cup-like recess in one side adapted to overlie said flow passage when the closure member is in closed position, and a cup-shaped sealing member disposed in said recess and opening outwardly with interior dimensions at least as great as that of the passage at its opening into the chamber, said sealing member in engagement with the bottom and walls of said recess, said sealing member having flexible portions with sealing surfaces disposed substantially in the contour of the periphery of said closure member adjacent the recess, whereby when said closure member is in closed position said flexible portions will surround said passage and the sealing surfaces will be moved by pressure within the sealing member into sealing engagement with the inner wall of said chamber about said passage.

2. In a plug type valve structure, a valve housing having a flow passage therethrough and a chamber for a valve closure member intersecting said passage, a plug type closure member in said chamber and movable to open and close said passage and having a cup-like recess in one side adapted to overlie said flow passage when the closure member is in closed position, and a cup-shaped sealing member disposed in said recess and in engagement with the bottom and walls of said recess, the sealing member forming outwardly faced lip-like portions with sealing surfaces disposed to substantially conform to the contour of the periphery of said closure member adjacent the recess with internal dimensions at least as great as those of the passage at its opening with the chamber, whereby when said closure member is in closed position said lip-like portions will surround said passage and the sealing surfaces will be moved by pressure within the sealing member into sealing engagement with the inner wall of said chamber about said passage.

3. In a plug type valve structure, a valve housing having a flow passage therethrough and a chamber for a valve closure member intersecting said passage, a plug type closure member in said chamber and movable to open and close said passage and having a cup-like recess in one side adapted to overlie said flow passage when the closure member is in closed position, a cup-shaped sealing member disposed in said recess and in engagement with the bottom and walls of said recess, the sealing member forming outwardly faced lip-like portions with sealing surfaces disposed substantially in the contour of the periphery of said closure member adjacent the recess with internal dimensions at least as great as those of the passage at its entrance to the chamber, whereby when said closure member is in closed position said lip-like portions will surround said passage and the sealing surfaces will be moved by pressure within the sealing member into sealing engagement with the inner wall of said chamber about said passage, said lip-like portions having their sealing surfaces directed toward the central axis of said recess and an outwardly flared portion on the outer surface of the sealing member providing a tight fit for the member in recess.

4. In a valve structure, a valve housing having a flow passage therethrough and a chamber for a valve closure member intersecting said passage, a closure member in said chamber and movable to open and close said passage and having a cup-like recess in one side adapted to overlie said flow passage when the closure member is in closed position, and a cup-shaped sealing member disposed in said recess and in engagement with the bottom and walls of said recess, the sealing member forming outwardly faced lip-like portions with sealing surfaces disposed substantially in the contour of the periphery of said closure member adjacent the recess with internal dimensions at least as great as those of the passage at its entrance to the chamber, whereby when said closure member is in closed position said lip-like portions will surround said passage and the sealing surfaces will be moved by the pressure within the sealing member into sealing engagement with the inner wall of said chamber about said passage, and a relatively hard and stiff reinforcing member in the bottom of said cup-like sealing member for reinforcing the same.

5. In a valve structure, a valve housing having a flow passage therethrough and a chamber for a valve closure member intersecting said passage, a closure member in said chamber and movable to open and close said passage and having a cup-like recess in one side adapted to overlie said flow passage when the closure member is in closed position, and a cup-shaped sealing member disposed in said recess and in engagement with the bottom and walls of said recess, the sealing member forming outwardly faced lip-like portions with sealing surfaces disposed substantially in the contour of the periphery of said closure member adjacent the recess with internal dimensions at least as great as those of the passage at its opening into the chamber, whereby when closure member is in closed position said lip-like portions will surround said passage and the sealing surfaces will be moved by the pressure within the sealing member into sealing engagement with the inner wall of said chamber about said passage, a portion of the outer surface of the wall of said cup being flared outwardly to cause it to fit tightly in said recess.

HERBERT ALLEN.

REFERENCES CITED

The following references are of record in the file of this patent:

UNITED STATES PATENTS

| Number | Name | Date |
|---|---|---|
| 1,053,327 | Stebbins | Feb. 18, 1913 |
| 1,430,685 | Sampson | Oct. 3, 1922 |
| 2,061,145 | Duffy | Nov. 17, 1936 |
| 2,114,789 | Urquhart | Apr. 19, 1938 |
| 2,196,785 | Takiguchi | Apr. 9, 1940 |
| 2,233,074 | Corbin | Feb. 25, 1941 |
| 2,285,222 | Mueller | June 2, 1942 |
| 2,354,967 | Perry | Aug. 1, 1944 |
| 2,371,657 | Stark | Mar. 20, 1945 |
| 2,401,377 | Smith | June 4, 1946 |

FOREIGN PATENTS

| Number | Country | Date |
|---|---|---|
| 710,360 | France | June 8, 1931 |